United States Patent
Shinji et al.

[19]

[11] Patent Number: 6,058,130
[45] Date of Patent: May 2, 2000

[54] LASER APPARATUS FOR GENERATING DIFFERENT WAVELENGTH REGIONS

[75] Inventors: Toshitake Shinji, Tokyo; Yasuo Ota; Hirokazu Nakamura, both of Aichi, all of Japan

[73] Assignees: NEC Corporation, Tokyo; Nidek Co., Ltd., Aichi, both of Japan

[21] Appl. No.: 09/012,214

[22] Filed: Jan. 23, 1998

[30] Foreign Application Priority Data

Jan. 23, 1997 [JP] Japan ..................................... 9-010430

[51] Int. Cl.[7] ...................................................... H01S 3/086
[52] U.S. Cl. ................................ 372/99; 372/23; 372/107
[58] Field of Search ................................. 372/15, 20, 23, 372/99, 107

[56] References Cited

U.S. PATENT DOCUMENTS

| | | | |
|---|---|---|---|
| 4,757,507 | 7/1988 | Wondrazek et al. | 372/23 |
| 4,852,115 | 7/1989 | Viherkoski | 372/99 X |
| 4,920,541 | 4/1990 | Baumgartner et al. | 372/23 |
| 5,249,192 | 9/1993 | Kuizenga et al. | 372/23 |
| 5,426,662 | 6/1995 | Mefferd et al. | 372/99 |

FOREIGN PATENT DOCUMENTS 63-71563  5/1988  Japan .

*Primary Examiner*—John D. Lee
*Attorney, Agent, or Firm*—Sughrue, Mion, Zinn, Macpeak & Seas, PLLC

[57] ABSTRACT

A laser apparatus has a laser device, a first reflection mirror, an output mirror and a second reflection mirror. The laser device oscillates first and second laser light beams. The first reflection mirror reflects a first laser light beam and is fixed at one end of an optical axis. The second reflection mirror reflects a second laser light beam and is arranged between the laser device and the first reflection mirror so as to be movable with respect to the optical axis. The output mirror reflects the first and second laser light beams and is fixed at the other end of the optical axis. With such a structure, the second reflection mirror is set to first and second positions. Specifically, the second reflection mirror is remote from the optical axis in the first position. Consequently, the first laser light beam is amplified between the first reflection mirror and the output mirror. On the other hand, the second reflection mirror is placed on the optical axis in the second position. Consequently, the second laser light beam is amplified between the second reflection mirror and the output mirror.

14 Claims, 9 Drawing Sheets

LASER APPARATUS FOR GENERATING DIFFERENT WAVELENGTH REGIONS

BACKGROUND OF THE INVENTION

This invention relates to a laser apparatus for selecting a laser light beam having a specific wavelength region among laser light beams having different wavelength regions.

In general, in many cases a laser device simultaneously oscillates laser light beams having a plurality of wavelength regions. In this event, a gas material is filled in an ion laser tube of the laser device (for example, a Krypton ion laser device or an argon ion laser device) and has a plurality of energy levels which are excited by discharge. Laser light beams having a plurality of wavelength regions are oscillated by amplification in accordance with a plurality of energy levels. The amplification is carried out by the use of a pair of optical resonance mirrors which are arranged opposite to each other via the ion laser tube. In this case, the light beam of the wavelength region to be oscillated is reflected to resonate between the pair of light resonance mirrors.

In the laser device (ion laser device) which oscillates the laser light beams having two or more wavelength regions, the laser light beam having a specific wavelength region is obtained from the ion laser device by adjusting reflection characteristics of the pair of resonance mirrors. Alternatively, the laser light beams having a plurality of wavelength regions which covers a wide wavelength region also may be obtained.

In addition, the laser light beams having different wavelength regions can be selectively obtained from the same ion laser device by switching a plurality of optical resonance mirrors corresponding to different wavelength regions.

It is useful to select different wavelength regions from a single laser device in the case of a medical care and applications of photosensitive and luminescence materials.

In this case, such a general concept that a specific wavelength region is selected by switching the mirrors is conventional in the laser apparatus which oscillates the laser light beams having two or more wavelength regions.

For example, a laser apparatus having two mirrors in a cradle, mounted via a bellows, inside a laser tube has been disclosed in U.S. Pat. No. 5,426,662 (reference 1). In such a laser apparatus, one mirror is selected from the two mirrors by switching the positions of the cradle.

On the other hand, another laser apparatus including a mirror mount having two mirrors outside a laser tube has been disclosed in Japanese Unexamined Utility Model Publication NO. S63-71563 (reference 2). In this laser device, one mirror is selected from the two mirrors by moving the mirror mount, like the reference 1.

However, the references 1 and 2 have the following defects. Namely, a structure for supporting the mirrors becomes complicated and heavy. Further, the oscillation inevitably halts when the mechanism for switching the positions of a mirror holder, such as the cradle and the mirror mount, fails. That is, because two mirrors are mounted to the same mirror holder, neither mirror may be positioned properly when the switching mechanisms fails.

SUMMARY OF THE INVENTION

It is therefore an object of this invention to provide a laser apparatus having a simple structure capable of selecting one mirror from a plurality of mirrors.

It is another object of this invention to provide a laser apparatus which is capable of ensuring an oscillation when a mirror selecting mechanism fails.

According to this invention, a laser apparatus has a laser device, a first reflection mirror, an output mirror and a second reflection mirror. The laser device oscillates first and second laser light beams. In this event, each of the first and second laser light beams has an optical axis. The first reflection mirror reflects a first laser light beam and is fixed at one end of the optical axis. The second reflection mirror reflects a second laser light beam and is arranged between the laser device and the first reflection mirror so as to be movable with respect to the optical axis. The output mirror reflects the first and second laser light beams and transmits a part of each of the first and second laser light beams as an output laser light beam and is fixed at the other end of the optical axis.

With such a structure, the second reflection mirror is set to first and second positions. Specifically, the second reflection mirror is remote from the optical axis in the first position. Consequently, the first laser light beam is amplified between the first reflection mirror and the output mirror. On the other hand, the second reflection mirror is placed on the optical axis in the second position. Consequently, the second laser light beam is amplified between the second reflection mirror and the output mirror.

DESCRIPTION OF THE PREFERRED EMBODIMENTS

Figure 1:
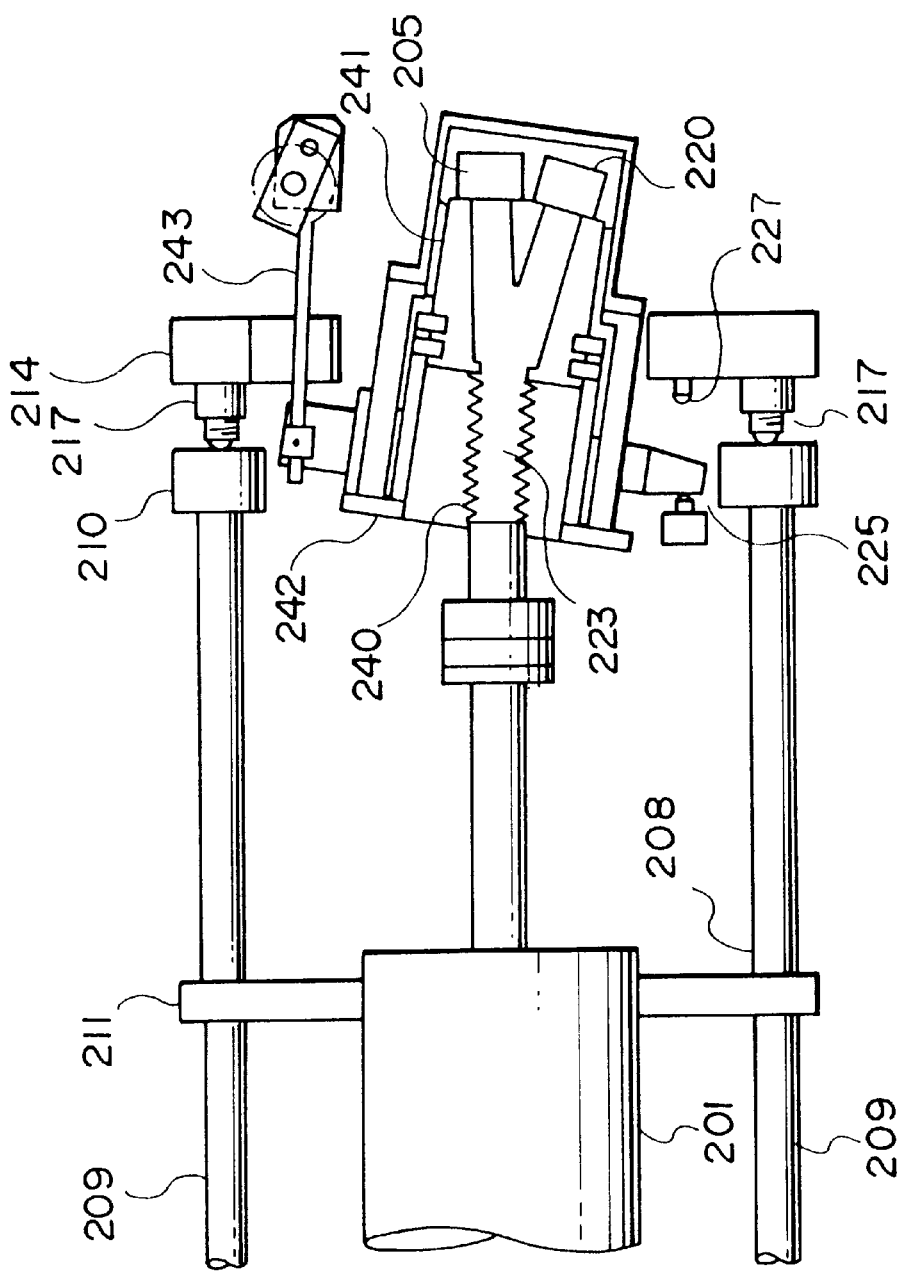
FIG. 1 is a schematic view showing a laser apparatus according to a first conventional technique.
Figure 2:
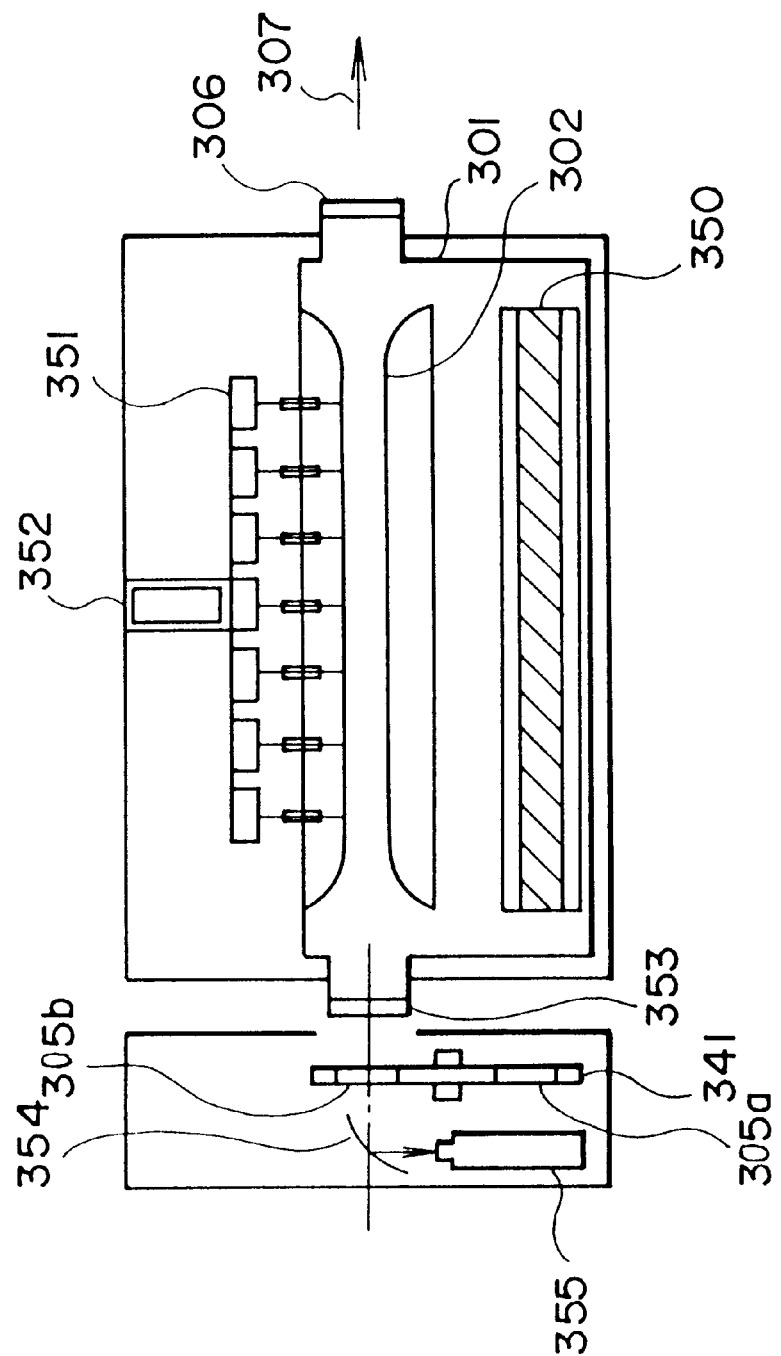
FIG. 2 is a schematic view showing a laser apparatus according to a second conventional technique.

Referring to FIGS. 1 and 2, the conventional laser apparatus will first be described for a better understanding of this invention. The laser apparatus is equivalent to the conventional laser apparatus described in the Background of the Invention of the instant specification.

In FIG. 1, an ion laser tube 201 is fixed to a resonator 208 which is composed of a plurality of rods 209 and plates 210 and 211. A movable plate 214 is connected to a plate 210 of the resonator 208 via a plurality of adjust screws 217. In this case, an angle of the movable plate 214 can be adjusted for a laser light axis by adjusting the adjust screws 217.

On the other hand, the ion laser tube 201 is an internal mirror type and is connected to a mirror supporter 241. A first total reflection mirror 205 for a first wavelength region and a second total reflection mirror 220 for a second wavelength region are provided in the mirror supporter 241. In this event, the first total reflection mirror 205 has a reflection characteristic compatible with the first wavelength region while the second total reflection mirror 220 has a reflection characteristic compatible with the second wavelength region.

An output mirror (not shown) is connected to an the other end of the resonator 208. The output mirror has a reflection characteristic which is compatible with both the first wavelength region and the second wavelength region. With such a structure, an optical resonator system is structured between the output mirror and either of the first total reflection mirror 205 and the second total reflection mirror 220.

The mirror supporter 241 is connected to a cradle supporter 242. The cradle supporter 242 is connected to the movable plate 214 via a screw 225 or a screw 227 which is disposed at the movable plate 214. The cradle supporter 242 can be set to two positions by contacting with either of the screws 225 and 227. The setting of the positions is carried out by adjusting the screws 225 and 227.

The cradle supporter 242 is connected to a pulse motor (not shown) via a connection axis 243. The cradle supporter 242 has a rotation axis 223 perpendicular to the laser light axis. The rotation of the pulse motor is transferred to the rotation in which the rotation axis 223 of the cradle supporter 242 is set as a center. Consequently, the cradle supporter 242 can select either of the two positions. The output mirror and the first total reflection mirror 205 constitutes the light resonator at a first position to oscillate the laser light beam of the first wavelength region while the output mirror and the second total reflection mirror 220 constitutes the light resonator at a second position to oscillate the laser light beam of the second wavelength region.

Further, one position is selected from the two positions of the cradle supporter 242 by driving the pulse motor under external control. Consequently, one light beam is selected from the light beams of the first and second wavelength regions as an output laser light beam.

The laser apparatus in reference 1 has an internal mirror type laser tube. Two kinds of total reflection mirrors are disposed via a flexible bellows in the laser tube. With such a structure, two positions are set for the cradle supporter 242 which supports two kinds of total reflection mirrors to select either one. Thus, the selection of the mirrors can be performed by accurately setting two kinds of positions with respect to the cradle supporter 242.

On the other hand, in FIG. 2, a laser tube 301 is filled with a gas material which is circulated by blower 350 for a laser oscillation. A discharge circuit is composed of a charge capacitor 351, a preliminary discharge gap (not shown) which is connected the charge capacitor 351, a peaking capacitor (not shown), a main discharge gap 302, a switching device 352 and a high voltage generating device (not shown). An output mirror 306 is disposed on an optical axis of the laser light indicated by an array at an one end of the laser tube 301 while a window 353 through which the laser light beam 307 passes is provided on the light axis at the other end of the laser tube 301. A rotation disk 341 is disposed outside of the window 353 of the laser tube 301. A pair of partial transmission mirrors 305a and 305b are provided on the rotation disk 341. The mirrors 305a and 305b are compatible with oscillation wavelength regions which are different from each other and are selectively disposed opposite to the output mirror 306. Further, a concave mirror 354 and a joule meter 355 are disposed to monitor an output of the laser light beam at the rear side of the partial transmission mirrors 305a and 305b. With this structure, any one among the partial transmission mirrors 305a and 305b are set on the optical axis by rotating the rotation disk 341 to select the oscillation wavelength region.

The eximer laser oscillator in reference 2 is an outer mirror type in which a plurality of mirrors for selecting wavelength regions are disposed outside of the laser tube. Reference 2 is different from reference 1 in shape of the mirror mount and a method of setting the rotation axis. However, reference 2 is similar to reference 1 in that a plurality of mirrors are attached to one mirror mount so that one mirror is selected by moving the mirror mount.

The above reference 1 has the following three problems.

First, the mirror supporter 241 has a heavy and complicated structure and, thereby, the laser apparatus itself has a heavy structure. The bellows 240 is made of a metal because the ion laser tube 201 constitutes a vacuum system. Therefore, the bending angle of the bellows 240 is restricted to the predetermined range. Consequently, the total reflection mirror 205 for the first wavelength region and the total reflection mirror 220 for the second wavelength region must be set in a narrow angle range and, therefore, the mirror supporter 241 must have a length long enough for the optical axis direction.

Further, an accuracy of $\mu$ rad is generally required for the mirror angle in the laser apparatus. It is impossible to dispose a plurality of mirrors with the $\mu$ rad accuracy by one mirror holder with the general mechanical tolerance. Therefore, the mirror supporter 241 must have such a structure that a fine position alignment can be performed for each mirror. Consequently, the mirror supporter 241 has a heavy and complicated structure.

Thus, the mirror supporter 241 as a movable member becomes large and heavy. Further, the cradle supporter 242 for supporting the mirror supporter 241 inevitably becomes large.

Second, the laser device is susceptible to a rising characteristic, a temperature characteristic and an environment characteristic such as a vibration impact. Where the mirror supporter 241 becomes large and heavy, a load for rods 209 which constitutes the resonator 208 also becomes large. Consequently, the laser apparatus is easily subjected to an environment effect. Further, when the mirror supporter 241 becomes complicated in structure, unstable factors, such as a positioning accuracy of each part, are increased. Consequently, the laser apparatus is easily subjected to the environment effect and further, an adverse effect is given for a stable operation of the laser apparatus.

Third, the laser apparatus has such a risk that oscillation of the laser light beams having the two kinds of wavelength regions halts at the same time when the position setting mechanism of the cradle supporter 242 fails.

Namely, when the connection axis 243 for setting the position of the cradle supporter 242 fails, it is impossible to set the position of the cradle supporter 242. In this case, it is also impossible to set the first and second wavelength regions because both the total reflection mirror 205 for the first wavelength region and the total reflection mirror 220 for the second wavelength region are disposed in the same cradle supporter 242.

The switching mechanism of the mirrors has a high risk with respect to failure as compared to the other portions because the switching mechanism frequently operates and has a complicated structure. It is undesirable that the two mirrors can not be used at the same time, in particular in the case of an emergency application such as medical care.

On the other hand, the above reference 2 has the following two problems.

First, the structure is complicated and heavy. Although the rotation disk 341 is illustrated in a simple manner in FIG. 2, the rotation disk 341 as a movable member practically has a complicated structure. This is because the rotation disk 341 retains a plurality of mirrors like in the reference 1. It is therefore necessary to arrange a fine adjusting mechanism for adjusting an angle between the mirrors. Consequently, the rotation disk 341 is easily subjected to an environment effect and has a problem with respect to a stable operation of the laser apparatus.

Second, the oscillation may halt when the position setting mechanism of the rotating disk 341 fails. This is because all mirrors are mounted on the single mirror holder like in the reference 1.

Taking the above-mentioned problems into consideration, this invention provides a laser apparatus which is capable of selecting, with a simple structure, one mirror from a plurality of mirrors.

First Embodiment

Referring FIGS. 3 to 6, description will be made about a laser apparatus according to a first embodiment of this invention.

In this case, an output mirror is common and two mirrors are used as total reflection mirrors. Alternatively, one total reflection mirror and two output mirrors may be used although an output efficiency may be lowered.

Figure 3:
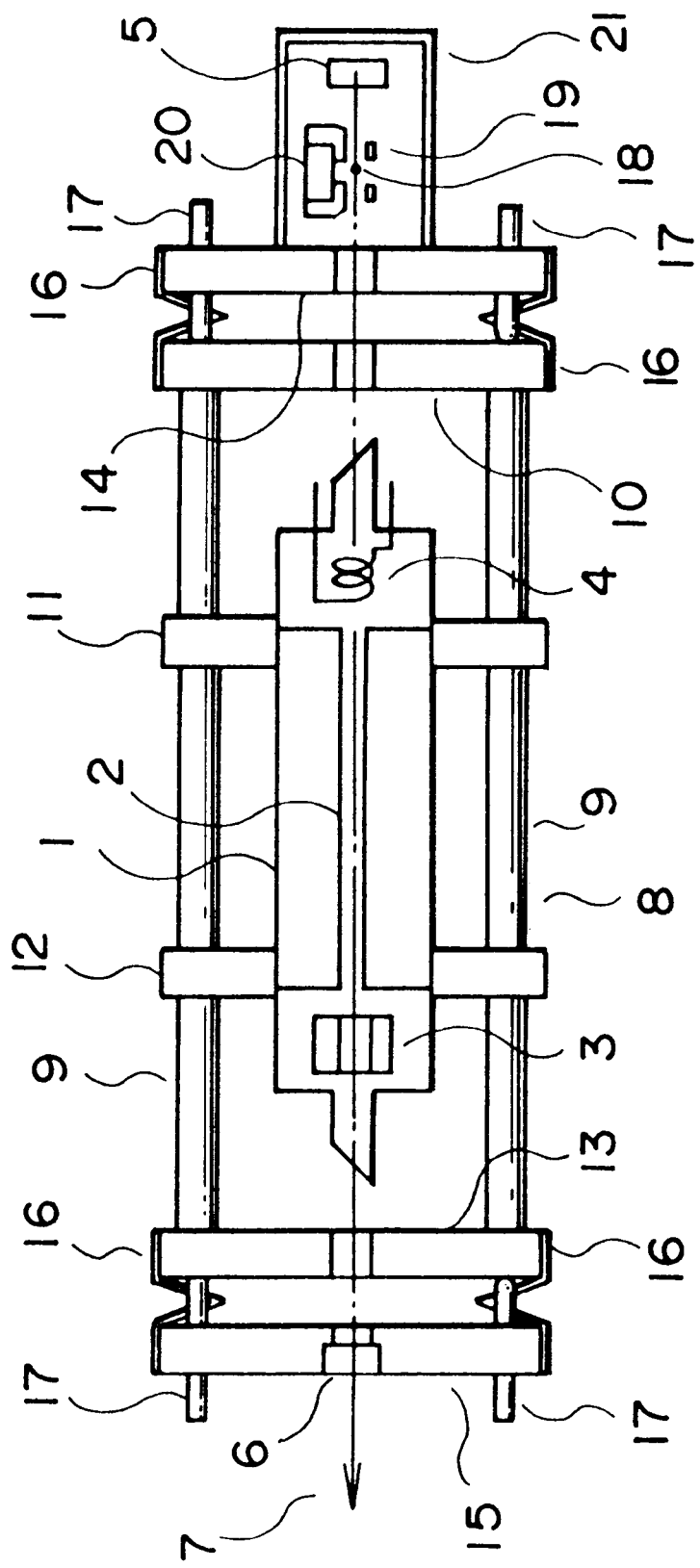
FIG. 3 is a side view showing a laser apparatus according to a first embodiment of this invention.

A laser apparatus illustrated in FIG. 3 is an external mirror type and has an ion laser tube 1 and a pair of optical resonance mirrors (a total reflection mirror 5 for a first wavelength region and an output mirror 6) which are independently arranged opposite to each other in the condition that the ion tube 1 is interposed. The total reflection mirror 5 for the first wavelength is connected to a movable plate 14 via a fixed mirror mount 22 illustrated In FIG. 4 and has a reflection characteristic compatible with the first wavelength region.

On the other hand, a total reflection mirror 20 for a second wavelength region is arranged on a movable mirror mount 19 which is movable for the movable plate 14 and has a reflection characteristic compatible with the second wavelength region different from the first wavelength region. The output mirror 6 (the other one among the optical resonance mirrors) has a reflection characteristic compatible with both the first and second wavelength regions. The total reflection mirror 20 for the second wavelength region is movable into two positions. In a first position, the reflection mirror 20 is positioned outside an optical resonance system consisting of the output mirror 6 and the first mirror 5 and constitutes the optical resonance system between the output mirror 6 and the first mirror 5 to oscillate the laser light of the first wavelength region. On the other hand, in a second position Illustrated in FIG. 6, the reflection mirror 20 is positioned inside the optical resonance system consisting of the output mirror 6 and the first mirror 5 and constitutes the optical resonance system between the output mirror 6 and the first mirror 20 to oscillate the laser light beam of the second wavelength region. The position of the second mirror 20 is selected by a pulse motor 32 illustrated in FIG. 4.

Figure 4:
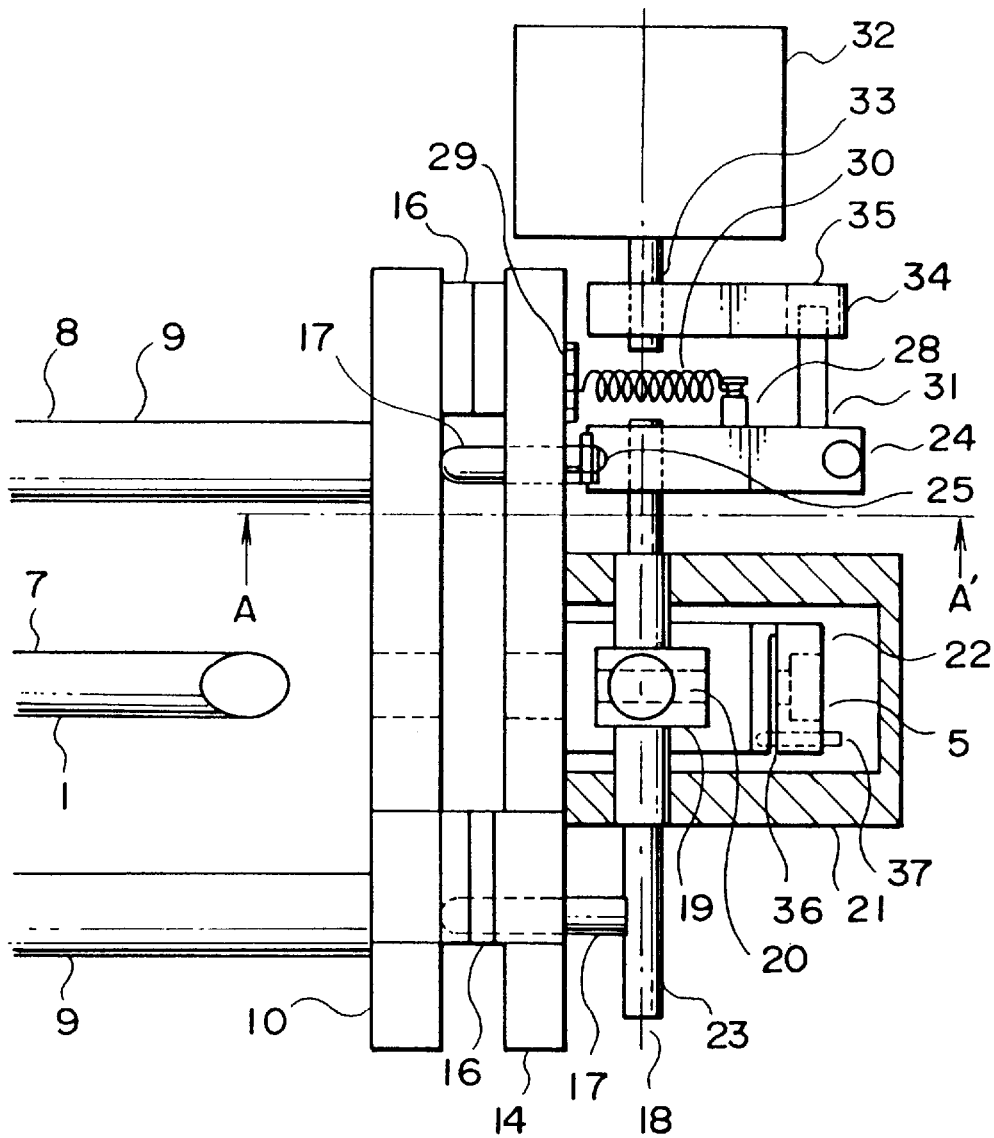
FIG. 4 is a partial top view showing the laser apparatus illustrated in FIG. 3.

As shown in FIG. 4, the fixed mirror mount 22 has an adjust screw 37 for adjusting a slit 36 and the width of the slit 36. An angle of the total reflection mirror 5 for the movable plate 14 can be adjusted by the adjust screw 37 of the fixed mirror mount 22.

Detailed description will be made about the embodiment of this invention referring to the figures.

The laser apparatus has an ion laser tube 1 in which a gas material for the laser oscillation is sealed and a pair of optical resonance mirrors (a first total reflection mirror 5 and the output mirror 6) which are arranged opposite to each other via the ion laser tube 1.

A straight and small cylindrical tube 2 is provided in the ion laser tube 1, and an anode 3 and a cathode 4 are arranged via the small tube 2. With such a structure, a discharge is performed by applying a voltage into the sealed gas material. Ionized atoms generate lights having a plurality of wavelength regions peculiar to the atoms during the discharge. In this event, the light of a specific wavelength region is amplified by the optical resonance mirrors 5 and 6 which are arranged opposite to each other via the ion laser tube 1. One mirror among the optical resonance mirrors corresponds to the first total reflection mirror 5 which reflects all light of the first wavelength region while the other one corresponds to the output mirror 6 which reflects a part of light of the first wavelength region and the second wavelength region and transmits a part of the light. A part of the light which is amplified between the first total reflection mirror 5 and the output mirror 6 is supplied to outside through the output mirror 6 to obtain the laser light beam 7.

It is necessary that the optical resonance mirrors 5 and 6 are precisely set to the perpendicular positions for the small tube 2 in the ion laser tube 1 to amplify the laser light beam.

Further, a resonator 8 is structured in the ion laser oscillator. Namely, the resonator 8 includes three rods 9 consisting of a material having a small thermal expansion rate such as inber or super inber (only two rods are illustrated in FIG. 3) and a plurality of plates 10, 11, 12 and 13 for combining the rods 9. The ion laser tube 1 is retained to two plates 11 and 12. Further, two plates 10 and 13 are attached to the both ends of the rod 9. The first total reflection mirror 5 and output mirror 6 are connected to movable plates 14 and 15, respectively, which are in turn connected to the plates 10 and 13 respectively. The movable plates 14 and 15 are connected to the two plates 10 and 13 via a plurality of springs 16. Further, three adjust screws 17 (only two screws on each side are illustrated in the figure) are connected to the two movable plates 14 and 15. A distance and an angle between the two movable plates 14, 15 and the two plates 10, 13 can be adjusted by the adjust screws 17.

A movable mirror mount 19, which is rotatable about rotation axis 18 perpendicular to the laser light 7, is provided at the movable plate 14. The second total reflection mirror 20 which reflects all light beam of the second wavelength region is arranged on the movable mirror mount 19. A cover 21 is connected to the movable mirror 14 to prevent the invasion of dust from the outside. The cover 21 is disposed around the periphery of the first total reflection mirror 5 and the second total reflection mirror 20.

In FIG. 4, the movable mirror mount 19, on which the second total reflection mirror 20 is mounted is connected to the movable plate 14. The first total reflection mirror 5 is arranged on the fixed mirror mount 22. The cover 21 shields the fixed mirror mount 22 and the movable mirror mount 19 from the outside.

Figure 7:
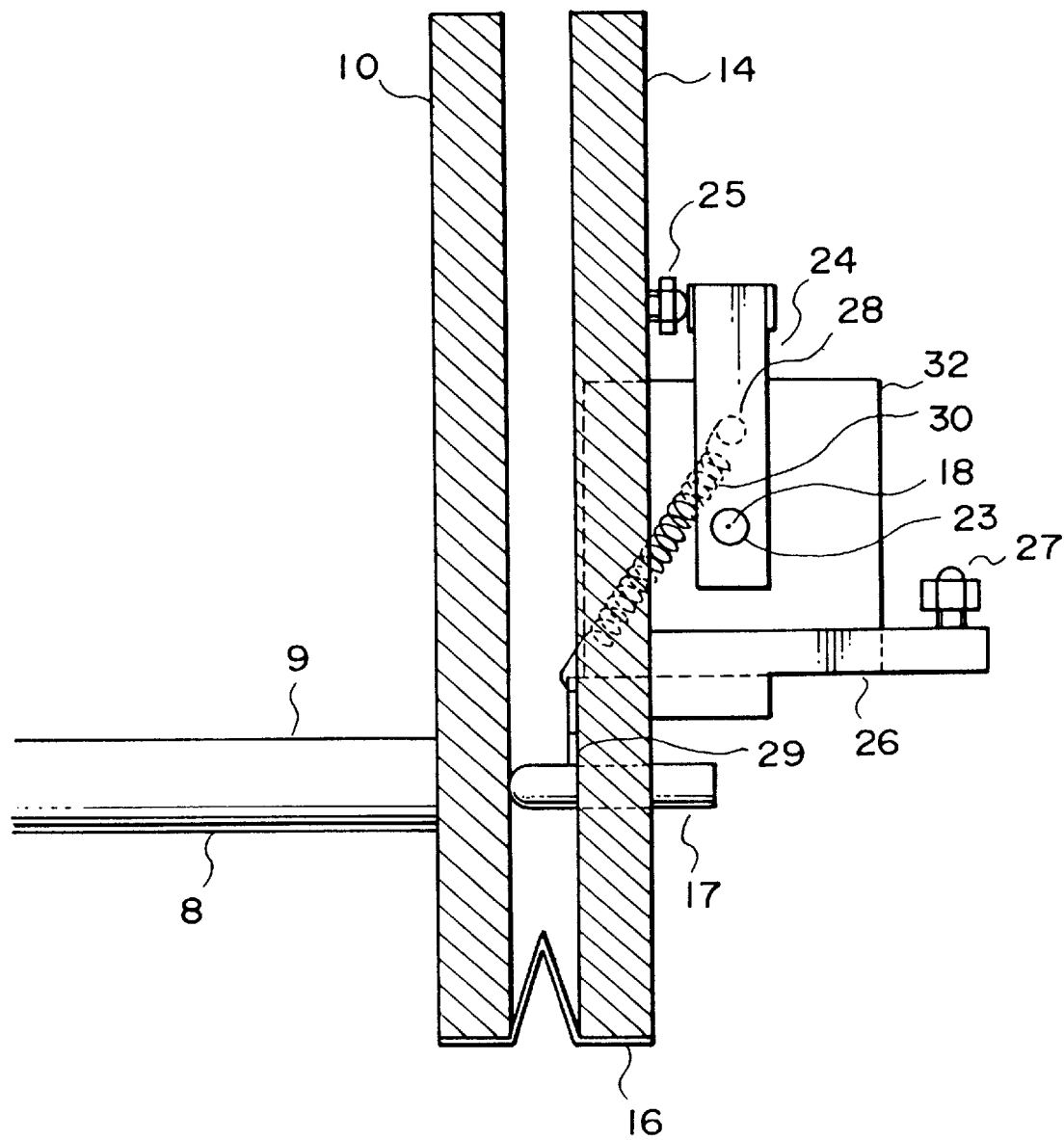
FIG. 7 is a partial side view showing the laser apparatus, taken along A—A' line in FIG. 4 where the movable mirror mount is set to the first position.
Figure 8:
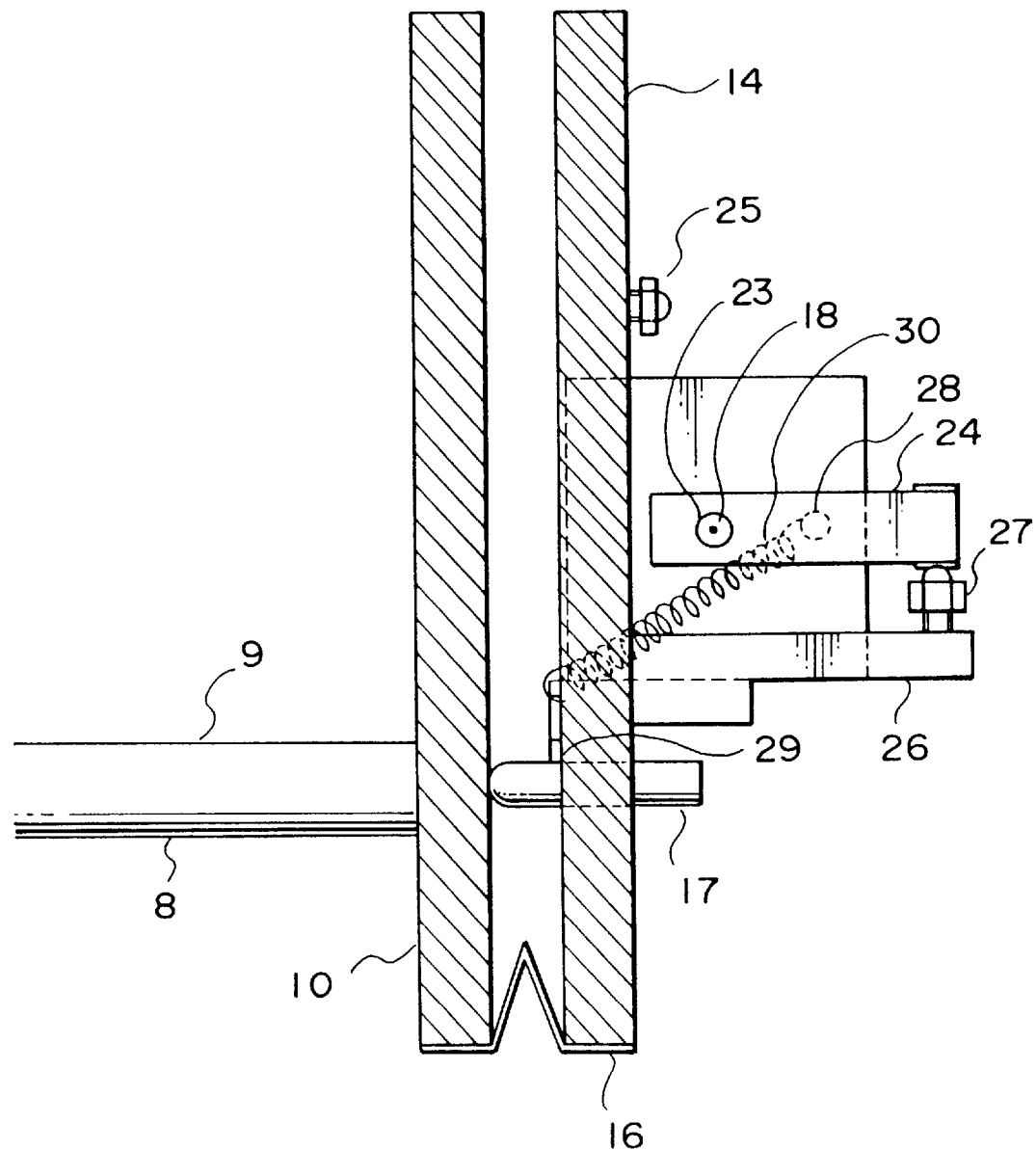
FIG. 8 is a partial side view showing the laser apparatus, taken along A—A' line in FIG. 4 where the movable mirror mount is set to the second position.

The rotation axis 23, which is rotatable for a center axis 18 perpendicular to the laser light beam 7, is provided on the movable mirror mount 19. A rotation arm 24 is provided on the one end of the rotation axis 23. A support screw 25 is retained to the movable plate 14, as illustrated in FIG. 7. The rotation arm 24 can be set to two positions by contacting with either of the support screw 25 and the support screw 27, as illustrated in FIGS. 7 and 8. The rotation arm 24 is fixed to the two positions via a coil spring 30. The coil spring 30 is retained by spring supporters 28 and 29. In this event, the spring supporter 28 is provided on the rotation arm 24 while the spring supporter 29 is arranged on the movable plate 14.

An arm 31 is arranged at the rotation arm 24. The pulse motor 32 is set so that the rotation axis 33 corresponds to the center axis 18. The rotation arm 34 is connected to the rotation axis 33. An opening 35 is provided at the rotation arm 34 so that the arm 31 is inserted to the opening 35. The rotation arm 24 is moved via the rotation arm 34 by operating the pulse motor 32. Consequently, the rotation arm 24 can select one position among two positions. A diameter of the opening 35 is set larger than that of the arm 31. The movable range of the rotation arm 34 is set smaller than that of the rotation arm 24 at the both ends. Thereby, when the rotation arm 24 contacts with the support screw 25 or the support screw 27, the rotation arm 34 does not contact with the arm 31 so that the pulse motor 32 receive no force from the rotation arm 24.

In addition, a slit 36 is arranged on the fixed mirror mount 22. The angle of the first total reflection mirror 5 can be adjusted in the parallel direction by adjusting screw 37. Thereby, the angles of the first total reflection mirror 5 and the second total reflection mirror 20 can be adjusted in the parallel direction so that angles in the parallel direction correspond to each other when the mirrors are switched.

The movement of the movable mirror mount 19 and the rotation arm 24 will be described in detail referring to the figures.

Figure 5:
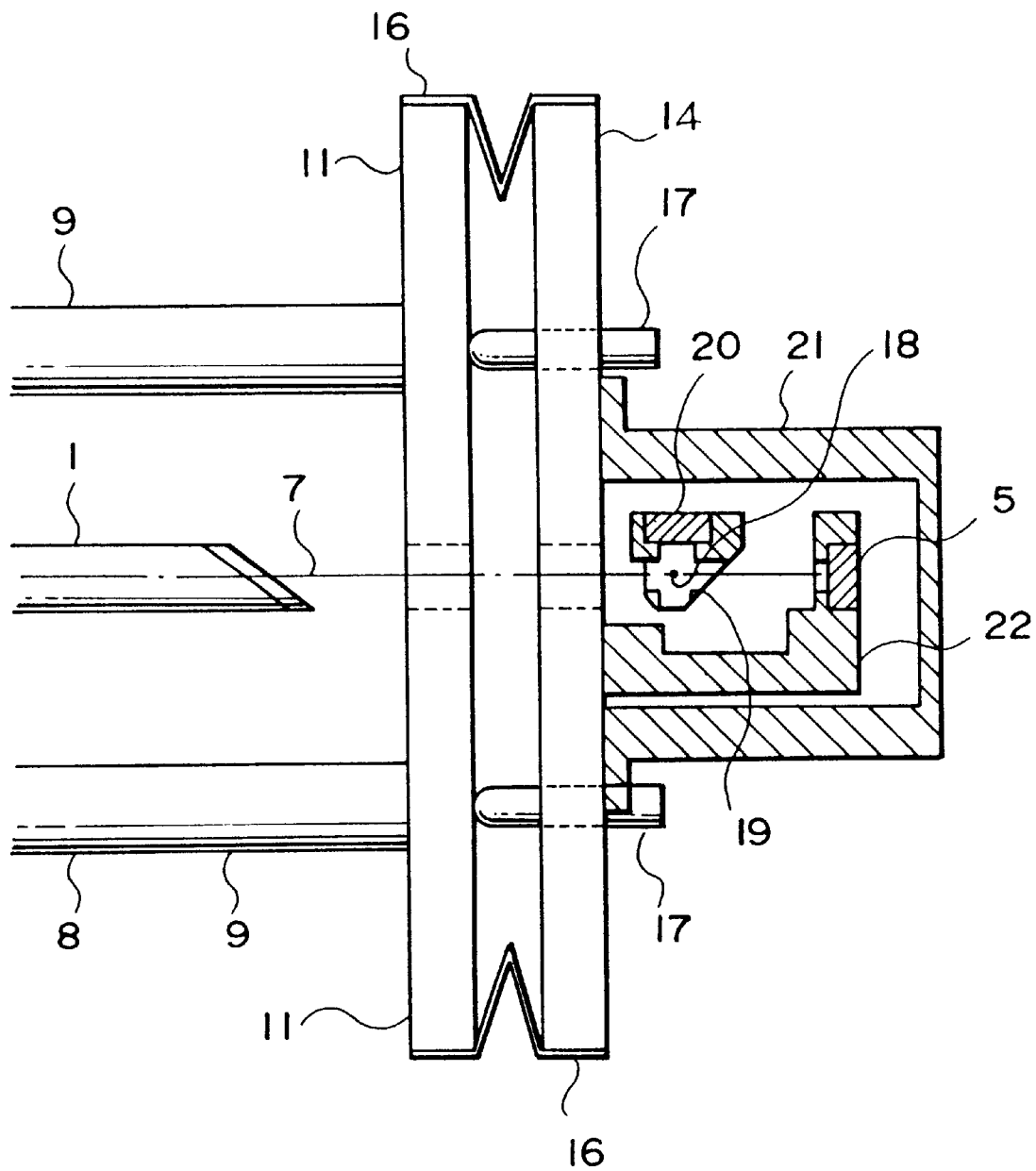
FIG. 5 is a partial side view showing the laser apparatus illustrated in FIG. 3 where a movable mirror mount is set to a first position.

In FIG. 5, through holes are provided at the movable mirror mount 19 so as to perpendicularly intersect. The second total mirror 20 is arranged close to one through hole while nothing is arranged in the other hole.

As shown in FIG. 5, the movable mirror mount 19 is set to the first position among the two positions so that the second total reflection mirror 20 is positioned outside the optical axis of the laser light. The laser light 7 reaches the first total reflection mirror 5 via the through hole of the movable mirror mount 19. The laser light 7 is reflected by the first total reflection mirror 5 to amplify the light beam of the first wavelength region.

Figure 6:
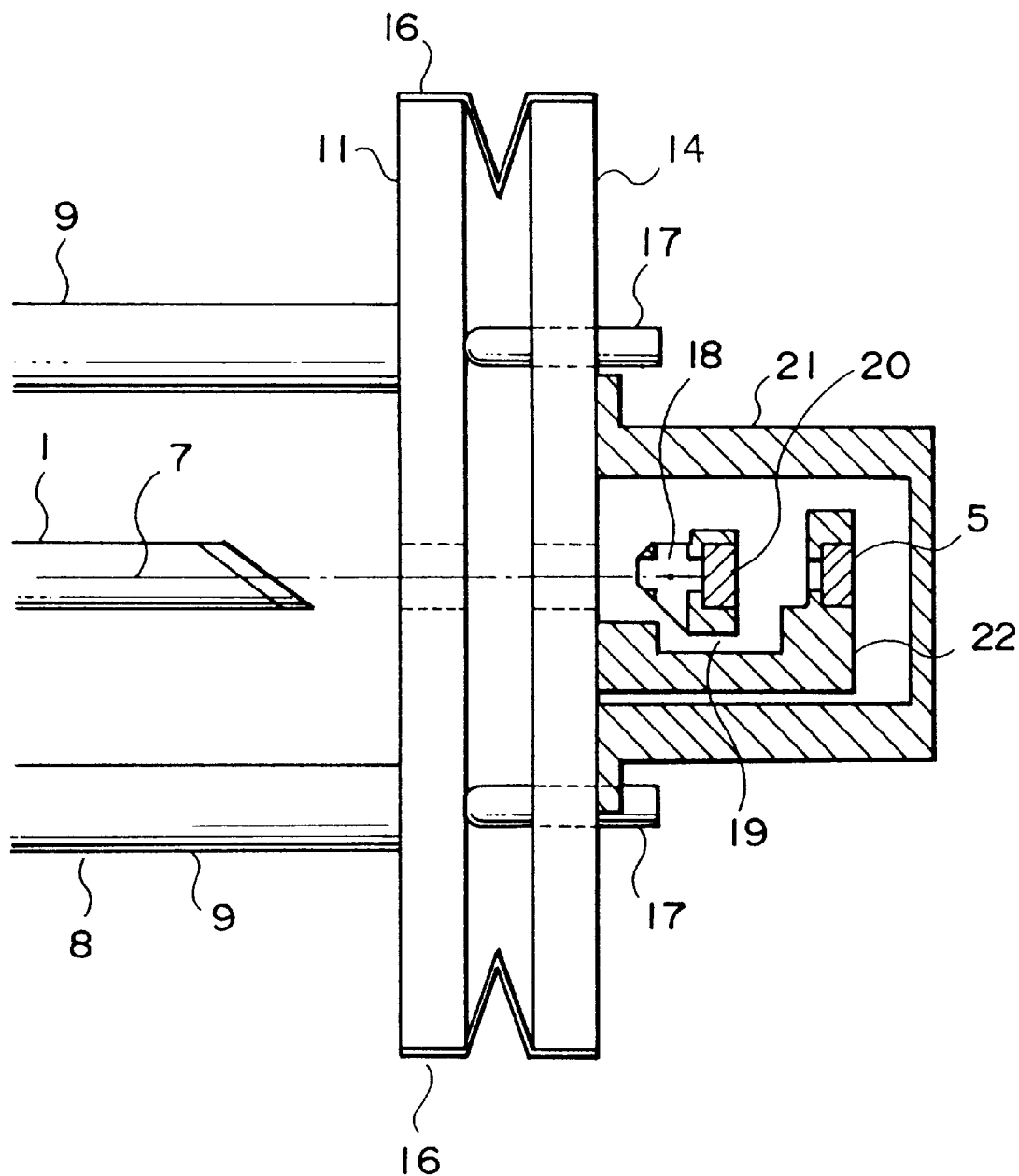
FIG. 6 is a partial side view showing the laser apparatus illustrated in FIG. 3 where the movable mirror mount is set to a second position.

In FIG. 6, the movable mirror mount 19 is set to the second position among the two positions. The second total reflection mirror 20 is set perpendicular to the optical axis of the laser light beam 7. The laser light beam 7 is reflected by the second total reflection mirror 20 to amplify the light beam of the second wavelength region. The laser light beam 7 is shielded by a supporter (not shown) for supporting the mirror so that it does not reach the first total reflection mirror 5. Consequently, the light beam of the first wavelength is not oscillated. Alternatively, a constant angle which is not vertical for the optical axis is set for the opposite surface of the reflection surface of the total reflection mirror 20 to deviate the optical axis when the total reflection mirror 20 is set to the second position. Thereby, the resonance relation of the total reflection mirror 5 is destroyed so that the light beam of the first wavelength region does not oscillate.

In FIG. 7, the fixed position of the rotation arm 24 is determined by the support screw 25 when the first position is selected by the pulse motor 32 which is given signals from a CPU (central processing unit). Further, the rotation arm 24 is fixed by the coil spring 30. In this event, the rotation arm 24 is connected to the movable mirror mount 19. The position of the rotation arm 24 can be finely adjusted by adjusting the support screw 25.

In FIG. 8, the fixed position of the rotation arm 24 is determined by the support screw 27 when the second position is selected by the pulse motor 32 which is given the signals from the CPU. Further, the rotation arm 24 is fixed by the coil spring 30. In this case, the rotation arm 24 is connected to the movable mirror mount 19. The position of the rotation arm 24 can be finely adjusted by adjusting the support screw 27. The angles of the first total reflection mirror 5 and the second total reflection mirror 20 can be perpendicularly adjusted so that the angles in the perpendicular direction corresponds to each other when the mirrors are switched.

Thus, the angle between the first total reflection mirror 5 and the second total reflection mirror 20 is adjusted by the adjust screw 37 in the parallel direction. Further, the angle is adjusted in the perpendicular direction by the support screw 27 which supports the rotation arm 24. Thus, an initial alignment can be achieved. Moreover, the lights of the first wavelength region and the second wavelength region can be freely selected by giving mirror switching signals from the CPU to the pulse motor 32.

In addition, even when the mirror switching mechanism fails, the fixed mirror mount 22 is not affected by the failure. Consequently, at least the oscillation of the light beam of the first wavelength region is ensured even when the light beam of the second wavelength region is not oscillated.

Two adjust screws 17 are connected to a pulse motor to perform an alignment of the horizontal and perpendicular directions. The CPU monitors the output of the laser light beam 7 and generates signals to realize the maximum value. Consequently, the optimum alignment condition can be realized.

In this event, the setting of the pulse motor can be memorized. The setting of the adjust screws 17 for the optimum alignment may be different between the total reflection mirror 5 and the total reflection mirror 20 when the light beams of the respective wavelength regions are oscillated by the total reflection mirror 5 and the total reflection mirror 20. Under this circumstance, the setting values of the pulse motor are first memorized to set the optimum positions of the respective adjust screws 17 for the light beams having the first wavelength region and the second wavelength region. Thereafter, each mirror can be automatically set to the optimum angle by the pulse motor each when the mirror is switched.

Second Embodiment

Figure 9:
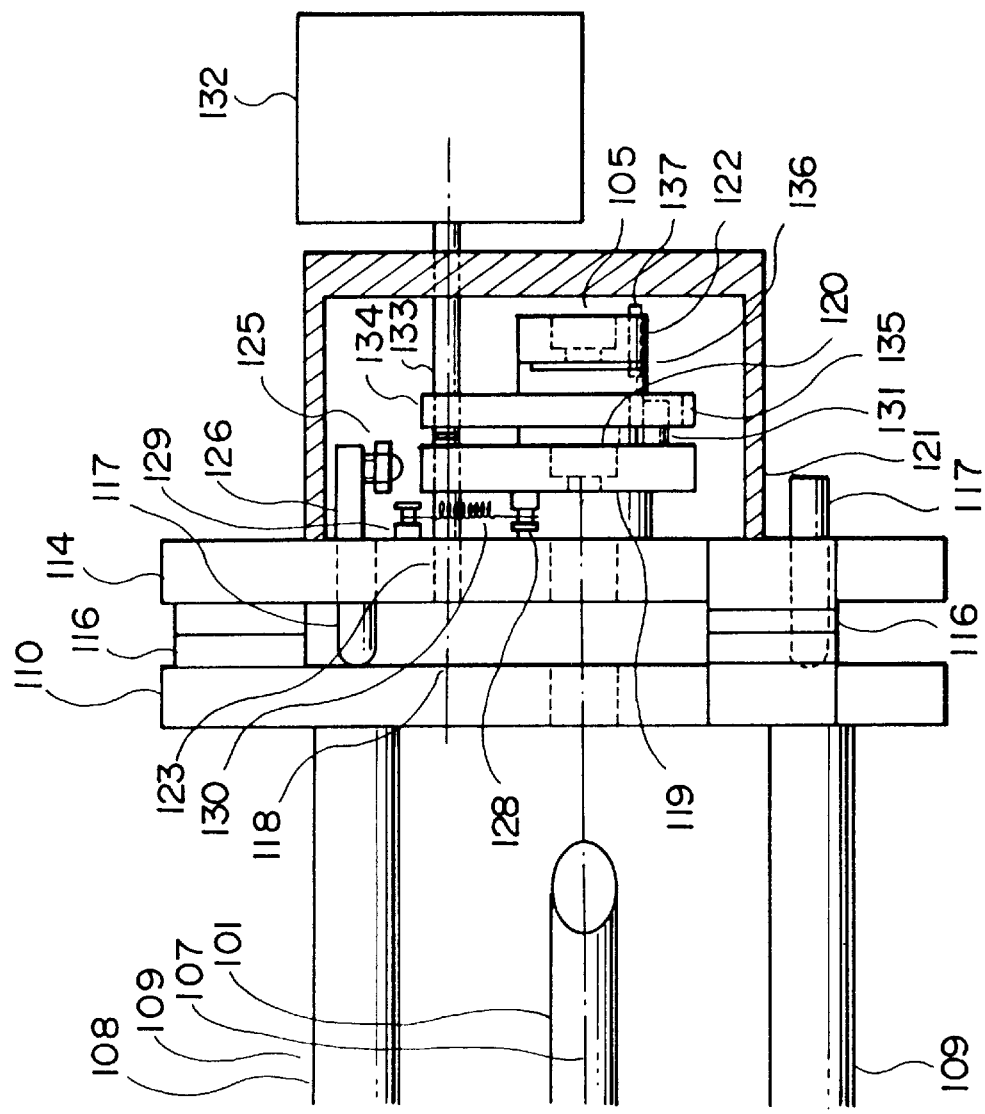
FIG. 9 is a partial top view showing a laser apparatus according to a second embodiment of this invention.

Referring to FIG. 9, a second embodiment of this invention will be described. In this case, reference numerals 101 to 121 illustrated in FIG. 9 correspond to 100 added to the reference numerals 1 to 21 illustrated in FIG. 3.

A fixed mirror mount 122 and the movable mirror mount 119 are connected to a movable plate 114. A total reflection mirror 105 for a first wavelength region is arranged on the fixed mirror mount 122 while a second total reflection mirror 120 for a second wavelength regin is arranged on the movable mirror mount 119. A cover 121 for preventing the invasion of external dust is disposed outside the fixed mirror mount 122 and the movable mirror mount 119.

A rotation axis 123 is provided on the movable mirror mount 119. In this event, the rotation axis 123 rotates with the center axis 118 which is an axis parallel to a laser light 107. Further, the movable mirror mount 119 also functions as a rotation arm. A support screw 125 is retained to the movable plate 114 via a supporter 126 while another support screw (not shown) is retained to the movable plate 114 via another supporter (not shown). The movable mirror mount 119 can be set to two positions by contacting with either of the support screw 125 and the another support screw (not shown). The fixation at the respective positions is performed via a coil spring 130. The coil spring 130 is retained by a spring supporter 128 which is arranged at the movable mirror mount 119 and a spring supporter 129 which is arranged at the movable plate 114.

An arm 131 is provided on the movable mirror mount 119. A pulse motor 132 is set so that the rotation axis corresponds to the center axis 118. A rotation arm 134 is connected to the rotation axis 133. An opening 135 is formed at the rotation arm 134 so that the arm 131 is inserted into the opening 135. The movable mirror mount 119 is moved via the rotation arm 134 by operating the pulse motor 132 to select one position between the two positions. In this event, the diameter of the opening 135 is set larger than the axis diameter of the arm 131.

The movable range of the rotation arm 134 is set slightly smaller than the movable range of the mirror mount 119. Consequently, when the movable mirror mount 119 contacts with the support screw 125 or the another support screw, the rotation arm 134 does not contact with the arm 131 and the pulse motor 132 does not receive the force from the movable mirror mount 119.

Further, a slit 136 is provided on the fixed mirror mount 122. The angles of the horizontal and vertical directions of the fixed mirror can be adjusted by an adjust screw 137 and the other adjust screw (not shown) which are connected to the slit portion. Consequently, the angle for the total reflection mirror 105 for the first wavelength region and the total reflection mirror 120 for the second wavelength region can be adjusted. Further, the lights of two wavelength regions can be oscillated when the mirrors are switched.

In addition, the two adjust screws 117 are connected to a pulse motor (not shown) so that alignments in the horizontal and the vertical directions can be performed. A CPU (not shown) monitors the output of the laser light 107 and generates signals to the pulse motor so that the maximum value is realized to obtain the alignment state.

In this case, the setting of the pulse motor can be memorized. When the total reflection mirror 105 for the first wavelength region and the total reflection mirror 120 for the second wavelength region oscillate the laser light beams of the respective wavelength regions, the total reflection mirror 105 and the total reflection mirror 120 are suitably aligned. When the setting of the alined adjust screws 117 is different, the pulse motor memorizes the setting value so as to set the optimum position of the adjust screws 117 for the light beam of the first wavelength region and the light beam of the second wavelength region. Thereby, each mirror can be automatically set to an optimum angle by the pulse motor even when the mirror is switched.

EXAMPLE

Referring to the figures, description will be made about an example of this invention.

A Kr ion laser is used as a first example and is applied to the first embodiment. The Kr ion laser oscillates a red light (647.1 nm), a yellow light (568.2 nm) and a green light (530.9 nm, 520.8 nm). The output mirror 6 corresponds to all of the red light beam, the yellow light beam and the green light beam. The total reflection mirror 5 for the first wavelength region corresponds to the yellow and green light beams while the total reflection mirror 20 for the second wavelength region corresponds to the red light beam. The light beam having the two kinds of wavelength regions of the red lightbeam and the yellow or green light beam can be obtained by switching the two total reflection mirrors 5 and 20.

In particular, it is very useful to select the wavelength region by only single apparatus with respect to an operation apparatus for an ophthalmic medical care because the wavelength region of the laser light beam used for the operation is different in accordance with a symptom of a patient. For example, the wavelength region of green to yellow is suitable in an eye treatment of retina peeling. However, when the eye of the patient is filled with blood, the red light beam is preferable because the green light Is easily absorbed by hemoglobin.

Subsequently, referring to FIG. 4, a detailed description of the example will be made.

The light beam of the first wavelength region corresponds to the yellow or the green light beam while the light beam of the second wavelength region corresponds to the red light beam. The total reflection mirror 5 for the first wavelength region corresponds to the yellow or green light beam while the total reflection mirror 20 for the second wavelength region corresponds to the red light beam.

The total reflection mirror 5 for the first wavelength region of the yellow or the green light beam has the reflection rate of 99.5% or more for the light of the wavelength region between 520 and 570 nm. On the other hand, the total reflection mirror 20 for the second wavelength region of the red light beam has the reflection rate of 99.5% or more for the light beam of the wavelength region between 640 and 680 nm. Further, the output mirror 6 has the transmission rate between 1 and 3% for the light beam of the wavelength region between 520 and 570 nm and between 640 and 680 nm. The total reflection mirror 20 for the second wavelength region of the red light beam is arranged on the movable mirror mount 19. The total reflection mirror 5 for the second wavelength region of the yellow or the green light beam is arranged on the fixed mirror mount 22.

The two adjust screws 17 are connected to the pulse motor (not shown). First, the pulse motor memorizes the optimum positions of the adjust screws 17 for the red light beam and the yellow or the green light beam. Thereafter, the total reflection mirror is automatically adjusted to the optimum angle when the mirror is switched.

In FIG. 5, the movable mirror mount 19 is set to the first position. The total reflection mirror 20 for the first wavelength region of the red light beam is moved outside the optical axis of the laser light 7. Consequently, the yellow and green light beams are amplified by the total reflection mirror 5 for the first wavelength region of the yellow and green lights.

In FIG. 6, the movable mirror mount 19 is set to the second position. The total reflection mirror 20 for the second wavelength of the red light beam is set perpendicular to the optical axis of the laser light 7. The laser light beam 7 is reflected by the total reflection mirror 20 of the second wavelength region to amplify the red light beam. In this event, the yellow and green light beams do not oscillate.

The oscillation of the yellow and green light beams is ensured when the mirror switching mechanism fails because the mirror 5 for yellow and green is arranged on the fixed mirror mount 22. In the practical medical care, the ability to continue the operation despite the switching mechanism's failure is important. In particular, the treatment can be easily performed during the switching mechanism's failure if the yellow and green light beams are oscillated.

Next, description will be made about a second example of this invention.

An Ar laser is used in the second embodiment. The second example may be applied to the first and second embodiments. The Ar ion laser oscillates a light beam of a visible region represented by 488.0 nm and 514.5 nm and a light beam of an ultraviolet region represented by 351.1 nm and 363.8 nm. The output mirror corresponds to both the visible light beam and the ultra violet light beam. In this event, the total reflection mirror 5 for the first wavelength region is used for the visible light beam while the the total reflection mirror 20 for the second wavelength region is used for the ultra violet light beam. With such a structure, the two kinds of light beams (the visible light beam and the ultra violet light beam) can be selectively obtained by switching the total reflection mirrors.

When the ultra violet light is used for a resin cure, the visible light beam is convenient for setting an optical system because the ultra violet light beam is invisible. Therefore, if the visible light beam and the ultra violet light beam can be selectively oscillated like this example, the optical system can be adjusted by the use of the visible light beam while the laser light beam can be irradiated by the use of the ultra violet light beam in accordance with the practical applications.

What is claimed is:

1. A laser apparatus for generating a first laser light beam having a first wavelength region and a second laser light beam having a second wavelength region different from the first wavelength region, comprising:

a laser device for oscillating the first and second laser light beams, each of the first and second laser light beams having an optical axis;

a first reflection mirror which reflects the first laser light beam and which is fixed at one end of the optical axis;

a second reflection mirror which reflects the second laser light beam and which is arranged between said laser device and said first reflection mirror, and which is movable with respect to the optical axis, said second reflection mirror being set to first and second positions which are remote from and placed on the optical axis, respectively; and a spring connected to said second reflection mirror so that said spring is capable of biasing said second reflection mirror to the first position, and so that said spring is also capable of biasing said second reflection mirror to the second position.

2. A laser apparatus as claimed in claim 1, wherein: said second reflection mirror is mounted on a movable mirror mount, said movable mount has a rotation axis perpendicular to the optical axis, and said second reflection mirror is set to the first and second positions by rotating the rotation axis.

3. A laser apparatus as claimed in claim 2, wherein: the rotation axis is connected to a pulse motor, and the rotation axis is rotated by driving said pulse motor so that said second reflection mirror is set to the first and second positions.

4. A laser apparatus as claimed in claim 1, wherein: said first reflection mirror is mounted on a fixed mirror mount.

5. A laser apparatus as claimed in claim 4, wherein: said fixed mirror mount has adjusting means for adjusting an angle of said first reflection mirror.

6. A laser apparatus as claimed in claim 5, wherein: said adjusting means comprises a slit and a screw for adjusting the width of the slit, the angle of said first reflection mirror is adjusted by adjusting the width of the slit.

7. A laser apparatus as claimed In claim 1, wherein: said laser device comprises an ion laser tube which is filled with a gas material.

8. A laser apparatus as claimed In claim 1, wherein: each of said first and second reflection mirrors comprises a total reflection mirror.

9. A laser light apparatus as claimed in claim 1, further comprising an output mirror which reflects the first and second laser light beams and transmits a part of each of the first and second laser light beams as an output laser light beam and which is fixed at the other end of the optical axis so that when said second reflection mirror is in said first position, the first laser light beam is amplified between said first reflection mirror and said output mirror, and when said second reflection mirror is in said second position, the second laser light beam is amplified between said second reflection mirror and said output mirror.

10. A laser apparatus for generating a first laser light beam having a first wavelength region and a second laser light beam having a second wavelength region different from the first wavelength region, comprising:

a laser device for oscillating the first and second laser light beams, each of the first and second laser light beams having an optical axis;

a first reflection mirror which reflects the first laser light beam and which is fixed at one end of the optical axis;

a second reflection mirror which reflects the second laser light beam;

means for switching said second reflection mirror between first and second positions, the first position being placed on the optical axis and the second position being remote from the optical axis; and a spring connected to said second reflection mirror so that said spring is capable of biasing said second reflection mirror to said first position, and so that said spring is capable of biasing said second reflection mirror to said second position.

11. A laser apparatus as claimed in claim 10, wherein: at least the first laser light beam is amplified between said first reflection mirror and said output mirror when said switching means is unable to move said second reflection mirror from said second position to said first position.

12. A laser apparatus as claimed in claim 10, wherein: said laser device comprises an ion laser tube which is filled with a gas material.

13. A laser apparatus as claimed in claim 10, wherein: each of said first and second reflection mirrors comprises a total reflection mirror.

14. A laser apparatus as claimed in claim 10, further comprising an output mirror which reflects the first and second laser light beams and transmits a part of each of the first and second laser light beams as an output laser light beam and which is fixed at the end of the optical axis which is opposite that on which said first reflection mirror is fixed.

* * * * *